United States Patent
Fernando et al.

(10) Patent No.: US 10,416,931 B2
(45) Date of Patent: Sep. 17, 2019

(54) FAULT TOLERANCE IN SHARED MEMORY

(71) Applicant: HEWLETT PACKARD ENTERPRISE DEVELOPMENT LP, Houston, TX (US)

(72) Inventors: Pradeep Fernando, Palo Alto, CA (US); Mijung Kim, Palo Alto, CA (US); Haris Volos, Palo Alto, CA (US); Jun Li, Mountain View, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 300 days.

(21) Appl. No.: 15/283,211

(22) Filed: Sep. 30, 2016

(65) Prior Publication Data
US 2018/0095834 A1  Apr. 5, 2018

(51) Int. Cl.
*G06F 3/06* (2006.01)
*G06F 11/14* (2006.01)

(52) U.S. Cl.
CPC ........... *G06F 3/067* (2013.01); *G06F 3/0619* (2013.01); *G06F 3/0644* (2013.01); *G06F 11/1425* (2013.01); *G06F 11/1438* (2013.01); *G06F 11/1441* (2013.01); *G06F 11/1451* (2013.01); *G06F 11/1474* (2013.01)

(58) Field of Classification Search
CPC .............. G06F 11/1425; G06F 11/1441; G06F 11/1451; G06F 11/1469
See application file for complete search history.

(56) References Cited

U.S. PATENT DOCUMENTS

| 5,414,840 A | 5/1995 | Rengarajan et al. |
| 2007/0192597 A1* | 8/2007 | Bade ............ G06F 21/57 713/167 |
| 2011/0173394 A1* | 7/2011 | Gara ............ G06F 9/30087 711/125 |
| 2014/0108917 A1* | 4/2014 | Style ............ G06F 17/30492 715/234 |
| 2017/0277452 A1* | 9/2017 | Joshi ............ G06F 3/0619 |

OTHER PUBLICATIONS

Malewicz, G., et al., Pregel: a System for Large-scale Graph Processing, SIGMOD'10, Jun. 6-11, 2010, pp. 135-145.
Zaharia, Matei et al; "Resilient Distributed Datasets: A Fault-Tolerant Abstraction for In-Memory Cluster Computing" USENIX.
Xin et al., "Project Tungsten: Bringing Apache Spark Closer to Bare Metal", (web page), Databricks, Posted in Engineering Blog, Apr. 28, 2015, 8 pages.
Li et al., "Scaling Distributed Machine Learning with the Parameter Server", OSDI'14 Proceedings of the 11th USENIX conference on Operating Systems Design and Implementation, 2014, 16 pages.
European Search Report and Search Opinion Received for EP Application No. 17186916.7, dated Feb. 20, 2018, 11 pages.

* cited by examiner

*Primary Examiner* — Jigar P Patel
(74) *Attorney, Agent, or Firm* — Hewlett Packard Enterprise Patent Department (57) ABSTRACT

Examples herein involve fault tolerance in a shared memory. In examples herein, a metadata store of a shared memory indicating versions of data partitions of a resilient distributed dataset and a valid flag for the partitions of the resilient distributed dataset are used to achieve fault tolerance and/or recover from faults in the share memory.

20 Claims, 8 Drawing Sheets

FAULT TOLERANCE IN SHARED MEMORY

BACKGROUND

Distributed data systems store objects across a plurality of data partitions of the distributed data systems. Accordingly, data associated with the objects is distributed among the plurality of partitions. Local processors of the data partitions may locally process the data of the corresponding partitions. The local updated data may then be recombined at a later stage to provide an updated object.

BRIEF DESCRIPTION OF THE DRAWINGS

Wherever possible, the same reference numbers will be used throughout the drawing(s) and accompanying written description to refer to the same or like parts.

DETAILED DESCRIPTION

Examples disclosed herein involve fault tolerance in a shared memory or off-heap memory store of a distributed data processing system. The example off-heap memory store uses a shared memory fabric to store partitions of a resilient distributed dataset (RDD). In examples herein, fault tolerance is achieved using versioned, partitioned, atomic RDDs over the shared memory, valid flags for the partitions, and lineage-based recomputation. In some examples, checkpoints may be implemented to lessen an impact of lineage-based recomputation.

Running large-scale iterative, memory intensive workloads via data processing engines in many previous technologies involves many inefficiencies. For example, RDDs may be immutable and used to store data updated in each iteration, thus involving multiple instances of cached RDDs and corresponding increase in memory consumption. Additionally, many systems involve non-deterministic garbage collection such that unreferenced RDDs continue to reside in heap memory until next garbage collection invocation, further increasing memory consumption. Furthermore, limited heap memory results in inefficient RDD cache eviction policy that causes eviction of cached RDD partitions that may need to be recomputed to return to a previous state in order to advance to a subsequent iteration. Accordingly, an off-heap memory store may be utilized for the RDDs creating an application managed memory representation of the RDDs. However, immutable RDDs result in lineage based data computations being possible but at the cost of unique object allocation of a RDD. Examples herein describe fault tolerance mechanisms that work in conjunction with off-heap memory store (or shared memory) RDD representation to mitigate large, bulk updates to data partitions and long lineage graphs (immutable data accumulation).

Examples herein provide extended off-heap memory store structures (e.g., in a shared memory) that enables mutable RDDs while supporting lineage-based fault recovery. In some examples, off-heap memory store checkpoints may be used to allow memory copy based lightweight checkpoints and provide re-computation bounds for lineage based recovery. In some examples, selective immutability of RDDs may be used via a persist/un-persist support in an off-heap least recently used (LRU) caching store.

Examples disclosed herein achieve fault tolerance in a shared memory system by tracking iterations of a process to update data partitions of an RDD, the data distributed among a plurality of partitions of a shared memory as a resilient distributed dataset. Further, for each partition of the RDD, examples involve, for each iteration, indicating an address of the partition and a version of the data in a metadata store of the shared memory and for each iteration, after writing the updated data to the respective partitions, indicate that the respective data partitions of the RDD are valid for recovery using valid flags. Examples disclosed herein enable recovery from a fault in a shared memory system, such that, upon recovery from a fault in a system comprising a shared memory, identifying invalid partitions of the shared memory storing data of a resilient distributed dataset, the invalid partitions indicated by a valid flag. Furthermore, for each invalid partition, examples involve identifying a version of the data partition of the resilient distributed dataset of the invalid partition at the time of the fault from a metadata store of the shared memory, and, for each partition, recomputing the data partition to return the data to the version at the time of the fault.

Figure 1:
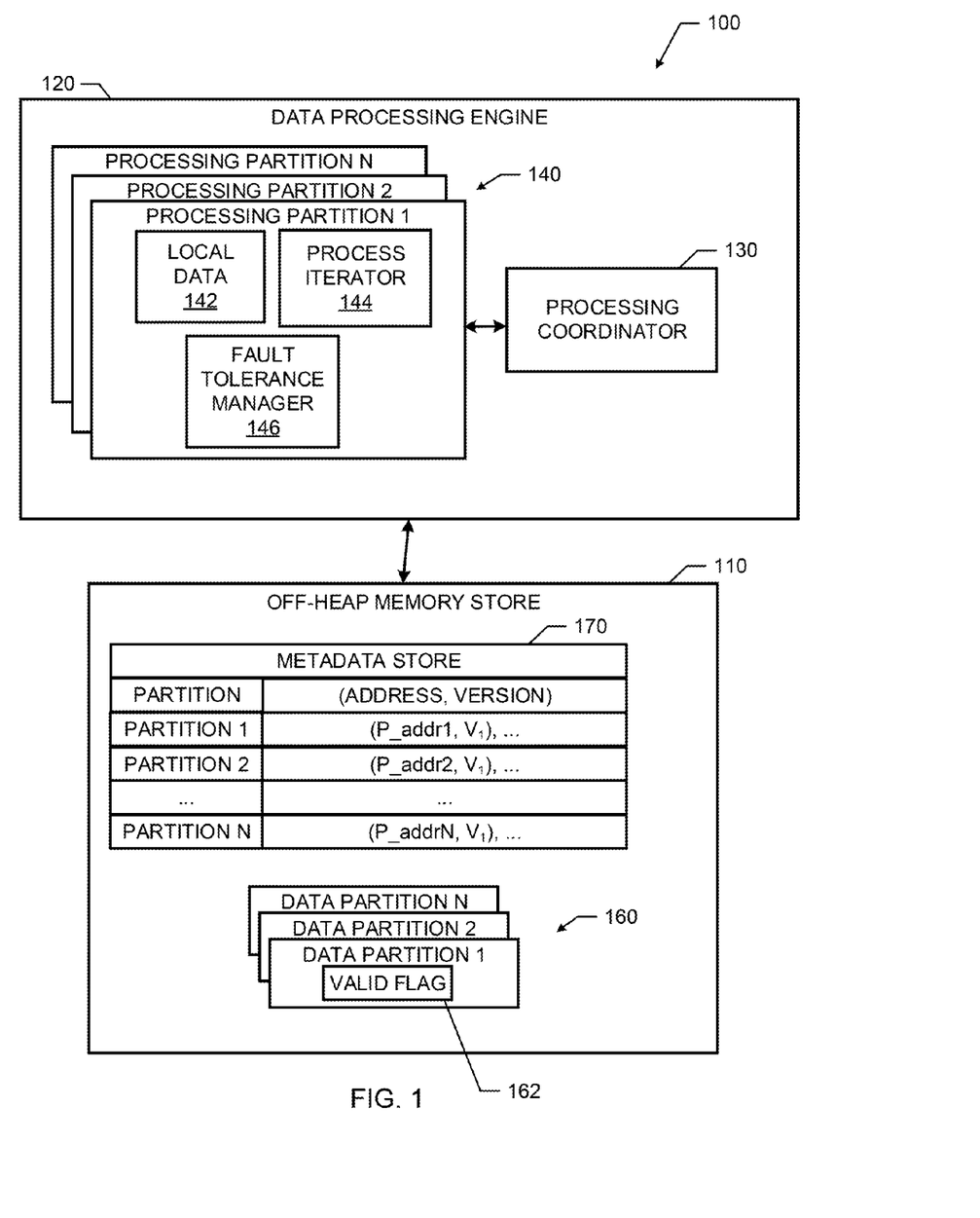
FIG. 1 illustrates a schematic diagram of an example data processing system including an off-heap memory store and fault tolerance managers implemented in accordance with examples herein.

FIG. 1 is a schematic diagram of an example data processing system 100 (e.g., a distributed data processing system) including an off-heap memory store 110 implemented in accordance with examples herein. The example data processing system 100 includes the off-heap memory store 110 (which may be referred to interchangeably herein as shared memory 110) in communication with a data processing engine 120. The example off-heap memory store 110 is implemented by a shared memory (e.g., a dynamic random access memory (DRAM), a non-volatile memory (NVM)) that is accessible by a plurality of processing nodes of the data processing engine 120. The example data processing engine 120 may be implemented by any heap processing engine (e.g. a data flow engine including a plurality of processing nodes). In examples herein, the data processing engine 120 may create (e.g., from a shared memory of the data processing system 100) and use the off-heap memory store 110 as a cache mechanism in accordance with examples herein. The data processing engine 120 may communicate with the off-heap memory store 110 via a high-speed interconnect that enables direct memory access to shared memory regions of the off-heap memory store.

The example data processing engine 120 of FIG. 1 may be a distributed data processing engine that includes a processing coordinator 130 and a plurality of processing partitions 140 (which may be collectively referred to herein as the processing partitions 140). The example processing partitions 140 (labelled Partition 1, Partition 2, . . . Partition N, where N is a number of processing partitions 140 of the data processing engine 120) of the data processing engine 120 include local data 142, a process iterator 144, and a fault tolerance manager 146. The example local data 142 may include a partition of a RDD (e.g., a graph) to for processing. The process iterator 144 is a processing node (e.g., a task thread scheduled by an operating system OS) of the data processing engine 120. The example process iterator 144 may be executed or perform operations on the partition of RDD in the local data 142 (which may be forward to a corresponding partition 160 in the shared memory 110). The example fault tolerance manager 146 manages fault tolerance such that the partitioned RDD may be recovered in the event of a fault in accordance with examples herein. The fault tolerance manager 146 uses mechanisms in the off-heap memory store 110 as described below to provide fault tolerance of the partitioned RDD.

In examples herein, the processing coordinator 130 of the data processing engine 120 may coordinate data processing (e.g., data shuffling, graph processing, etc.) of the RDD partitions and use of the off-heap memory store 110. The processing coordinator 130 of FIG. 1 may serve as a master processor of the processing partitions 140.

The example off-heap memory store 110 of FIG. 1 includes partitions 160 of RDD data (labelled Data Partition 1, Data Partition 2, . . . Data Partition N, where N is a number of partitions 160 of the data processing engine 120) in accordance with examples herein. In FIG. 1, each of the partitions 160 of RDD corresponds to (e.g., is owned by, is controlled by, etc.) one of the processing partitions 140 that locally process the RDD data (e.g., as local data 142. For example, Data Partition 1 may be owned or operated on by the process iterator 144 of Processing Partition 1, Data Partition 2 may be owned by the process iterator 144 of Processing Partition 2, etc. Each of the partitions 160 includes a valid flag 162, which may be used to indicate whether the data partition in valid (e.g., that the data partition is fully or completely updated/accurate). The partitions 160 are valid before write operation is started or after a write operation is complete and invalid during a write operation. The example valid flag 162 may be a binary indicator that indicates whether the data partitions 160 are valid or invalid (e.g., 1=valid, 0=invalid or true=valid, false=invalid). The example fault manager 146 uses the valid flag 162 to ensure atomic RDD updates to the partitions 160 in the off-heap memory 110.

The example off-heap memory store 110 further includes a metadata store 170. The example fault manager 146 may use the metadata store 170 to ensure fault tolerance while the processing partitions 140 process the partitions 160 of the RDD. The example metadata store 170 may be an index, table, or any other suitable data structure. The example metadata store 170 tracks partitions 160 of the RDD and addresses of the partitions 160 (labelled ADDRESS) and corresponding versions (labelled VERSIONS) of the partitions 160 of the RDD at those addresses during processing of the RDD. For example, the version may be updated after each iteration of processing the RDD (e.g., after each iteration of loop of a process). In examples herein, the address field may include multiple addresses for a particular partition 160 of the RDD. Accordingly, multiple versions corresponding to the multiple locations of the partition 160 of the RDD may be indicated in the metadata store 170. The example metadata store 170 may be populated when input data including an RDD is loaded into the shared memory 110. In some examples, there may be multiple memory stores 170 for each RDD stored in the shared memory 110 and processed in the processing partitions 140. Accordingly, the fault manager 146 may refer to the metadata store to maintain fault tolerance and to recover a RDD after the system 100 experiences a fault. For example, the metadata store 170 may be returned as the RDD, at which point the process iterators 144 may re-execute the RDD input data from an original version to the versions indicated in the respective partitions of the metadata store 170. In some examples, the off-heap memory store may include a checkpoint persist (see FIG. 4), such that checkpoint may be used to lessen the cost of lineage-based recomputation. In other words, a checkpoint persist may store the state of the RDD at a particular version to prevent lineage-based re-computing from beginning at an original version of the RDD. An example checkpoint persist may be implemented by an index, table, or any other suitable data structure.

In examples herein, the process iterators 144 of the processing partitions 140, considered owners/controllers (i.e., have write access capabilities) of the corresponding partitions 160, create the partitions 160 of the RDD via the local data 142. Accordingly, the process iterators 144 process through execution of its respective partition 160 of the RDD and updates the version of the partition 160 in the metadata store 170. The process iterators 144 may refer to the metadata store 170 to identify addresses or locations for a particular partition 160 of the RDD to perform updates in-place. Accordingly, old versions of the RDD data in a partition 160 may be overwritten by the process iterator 144 with the new version of the RDD data of the partition 160, such that the new version of the partition 160 of the RDD is written in a same address as an old version of the same partition 160 of the RDD. In some examples, for a version, address tuple in the metadata store 170 that points to an address of a previous version, the address of the previous version may be reused by removing the old version, address tuple in the memory store 170 with a new version, address tuple pointing to the same address.

Furthermore, in examples herein, the processing partitions 140 of FIG. 1 may be located on a machine node that is attached to the same memory fabric as the off-heap memory store 110 (and thus the partitions 160). Accordingly, a difference between memory regions storing the processing partitions 140 and the memory regions storing the partitions 160 (i.e., the off-heap memory store 110), may be that the memory storing the processing partitions 140 is a non-shared memory while the memory storing the partitions 160 is a shared memory.

Figure 2:
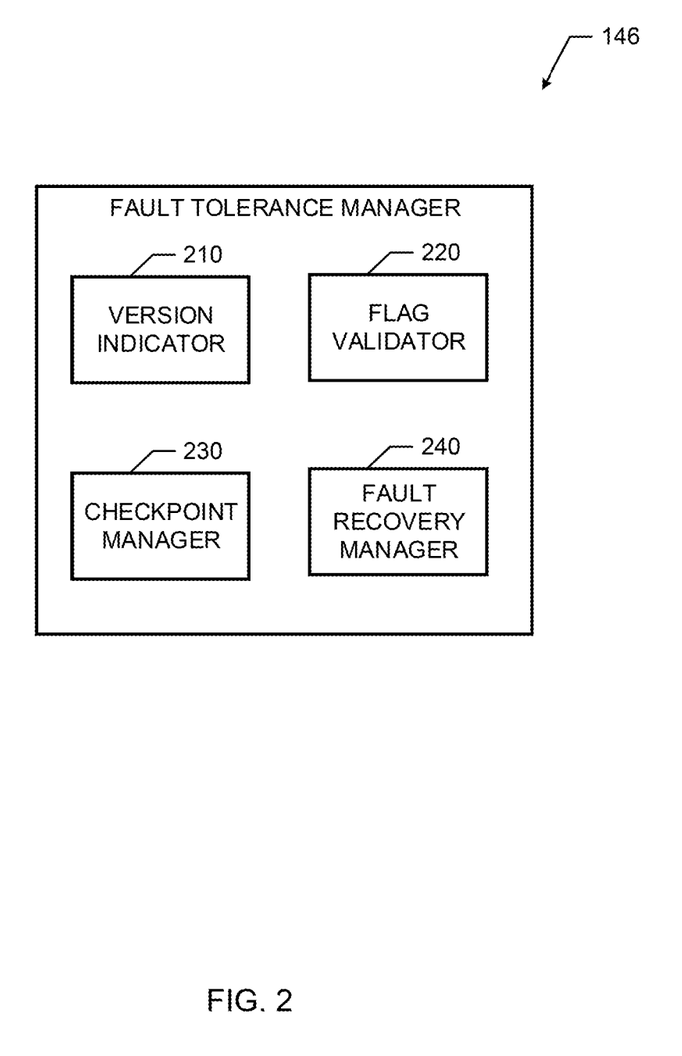
FIG. 2 a block diagram of an example fault tolerance manager that may be used to implement the fault tolerance managers of FIG. 1.

FIG. 2 is a block diagram of an example fault manager 146. The fault manager 146 of FIG. 2 may be used to implement the fault manager 146 of FIG. 1. The example fault manager 146 of FIG. 2 includes a version indicator 210, a flag validator 220, a checkpoint manager 230, and a fault recovery manager 240. In examples herein, fault tolerance of a partitioned RDD may be achieved using the version indicator 210 to update versions of the partitions 160 of the RDD data in the metadata store 170 of the shared memory 110 and the flag validator 220 to control the valid flag 162 based on the validity of the partitions 160 of the RDD.

The version indicator 210 of FIG. 2 tracks the iterations of partitions 160 of a RDD processed by the respective process iterators 144. After each iteration, the version indicator 210 updates the version of the partition 160 of the RDD. For example, the version indicator 210 may implement a counter, which counts the number of iterations performed on a partition of the RDD by the respective process iterator 144. As such, the version may increase from an original version (e.g., version '0') up to version 'N', where N represents the number of iterations of the respective process iterator 144 processed the partition 160 of the RDD. After or during each iteration or update to the partitions 160 of the RDD data, the version indicator 210 updates the versions in the metadata store 170 of the shared memory 110. Accordingly, the version indicator 210 tracks and stores the number of processed iterations during execution of a partition 160 of the RDD data in the respective processing partitions 140. As such, the version indicator 210 enables the fault tolerance manager 146 to accurately correlate a RDD to an off-heap stored partition 160 of the RDD data, given an identifier of the partition 160 and the version indicated.

The example flag validator 220 tracks atomic RDD updates of partitions 160 of the RDD to ensure that an update from an old version of the RDD data partition 160 to a new version of the RDD data partition 160 is complete. The atomicity of the RDD updates is achieved using the valid flags 162. As a partition 160 of a RDD may be updated in-place, RDD data corruption may be detected during faults (or task failures) in the shared memory 110 using the valid flags 162 and further corrected during recovery. For example, the flag validator 220, for each RDD iteration and update to a partition 160 of RDD data, may (1) set the valid flag 162 to invalid (e.g., 0 or false) (atomic operation), (2) track the write (or update) of the partition 160 of the RDD (during or after which the version indicator 210 may update the version of the partition 160 in the metadata store 170), and (3) after completion of the write, set the valid flag 162 for the partition 160 of the RDD to valid (e.g., 1 or true) (atomic operation). In some examples, to push the data down to the shared memory 110 from the processing partitions (e.g., volatile memory or cache), flush instructions (e.g., CLFLUSH/PCOMMIT) may be used at each of the above steps. Accordingly, the valid flags 162 of the partitions ensure atomic updates to the partitions 160 of the RDD are achieved.

Figure 4:
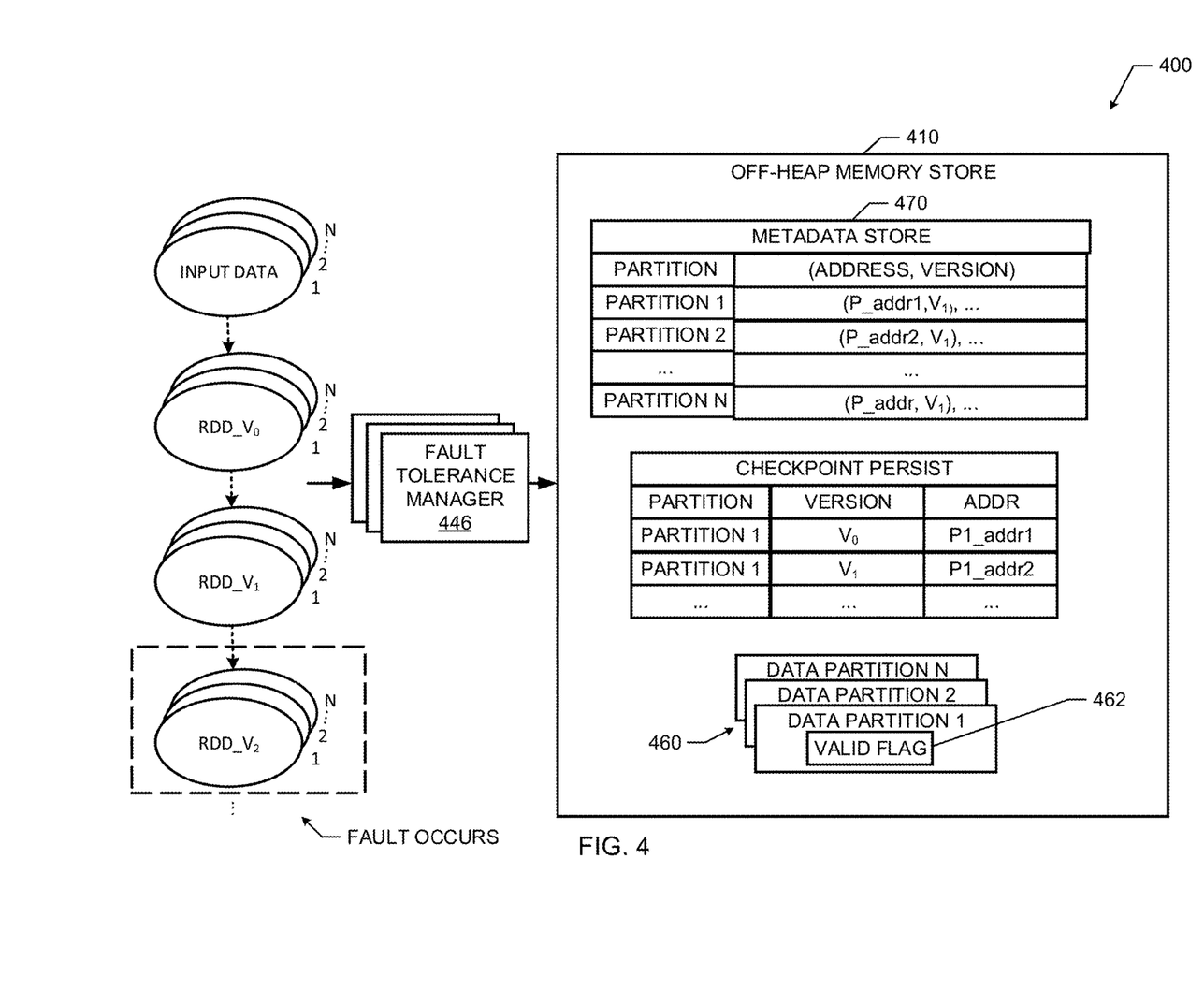
FIG. 4 is a schematic diagram of an another example off-heap memory fault tolerance system using a checkpoint persist that may be implemented by the data processing system of FIG. 1

The example checkpoint manager 230 of FIG. 2 may be used to bound lineage-based recomputation using checkpoints or a checkpoint persist (see FIG. 4). In examples herein, the checkpoint manager 230 and checkpoint persist may be used to prevent lineage-based recomputation during fault recovery from beginning at an original version of the partition 160 of the RDD, but rather to begin from a persisted, checkpoint version of the partition 160. For example, a checkpoint persist may be used in addition to or alternative to the version field of the metadata store 170. The example checkpoint persist may include a RDD version identifier and corresponding addresses of the version of a partition 160 of the RDD. Accordingly, the partitions 160 may include multiple checkpoint versions of the RDD data. The metadata store 170, using a checkpoint persist in the off-heap memory 110, thus tracks the locations of the versions of partitions 160 of the RDD in the shared memory 110.

In examples herein, the checkpoint manager 230 may allow for selective immutability of RDDs in the off-heap memory store 110. For example, certain RDDs (or partitions 160 of RDDs) may be tagged to use a checkpoint, and thus may not necessarily have in-place updates as described above. The example checkpoint persist may be implemented using a least recently used (LRU) cache in the shared memory 110 (see FIG. 4) that can be sized such that the depth of the cache governs the time-to-live for a materialized RDD. Accordingly, upon recovery from a fault, the metadata store 170 with checkpoint persist may be referred to in order to identify the most recently updated version of a particular partition 160 of the RDD in the shared memory 110.

The example fault recovery manager 240 of FIG. 2 handles recovery of RDD data after a fault in the shared memory system 100 of FIG. 1. Upon recovery from a fault (e.g., a task failure, power failure, unexpected shutdown, etc.), the fault recovery manager 240 utilizes the metadata store 170 and valid flags 162 in the partitions 160 to recover the RDD data. For example, the fault recovery manager 240 may refer to the valid flags 162 to determine whether a fault occurred during an update to the respective partitions 160 of the RDD. For each of the partitions 160 that have invalid data as indicated by the valid flags 162, the fault recovery manager 240 refers to partition identifier corresponding to the partition 160 in the metadata store 170. The fault recovery manager 240 identifies the version of partition 160 stored in the metadata store 170 (which would be the version of the RDD at or near the time of the fault), and instructs the corresponding process iterator 144 to re-compute the RDD data to reach the version of the partition 160 indicated in the metadata store 170. For example, the fault recovery manager 240 may instruct the process iterators 144 to perform a number of iterations from the original version of the partition 160 of the RDD to a version of the partition 160 that corresponds to the version indicated in the metadata store 170. After the process iterators 144 re-compute the partition 160 of the RDD to the version indicated the in the metadata store 170, the fault recovery manager 240 may return control to the process iterators 144 (and/or process coordinator 130) to resume execution/processing of the partition 160.

In examples herein in which a checkpoint persist is used, the fault recovery manager 240 may refer to the memory store 170 to identify a valid location of a most recent version of a particular partition 160 of a RDD. For example, for each partition 160, the recovery manager 240 may identify versions of the partition and corresponding addresses of the versions of the RDD that are storing most recent valid (as indicated by the valid flags 162) versions of the RDD. The fault recovery manager 240 then restores the version of the partition 160 of the RDD in the checkpoint persist. After the most recent valid version of a partition 160 is restored (e.g., to the processing partitions 140 and/or a designated partition 160 for the RDD data), the recovery manager 240 may instruct the process iterators 144 and/or the process coordinator 130 to resume execution of the partition 160.

Accordingly, the fault tolerance manager 146 of FIG. 2 utilizes the valid flags 162 and the metadata store 170 to ensure fault tolerance and recover RDD data from faults. In some examples, the fault tolerance manager 146 may implement selective immutability using a checkpoint persist that preserves versions of partitions of the RDD data after each iteration in additional or separate addresses from previous versions of the respective partitions. Accordingly, the partitions 160 of a RDD in a shared memory (e.g., the off-heap memory store 110) may be recovered in the event of a fault.

While an example manner of implementing the fault tolerance manager 146 of FIG. 1 is illustrated in FIG. 2, at least one of the elements, processes and/or devices illustrated in FIG. 2 may be combined, divided, re-arranged, omitted, eliminated and/or implemented in any other way. Further, the version indicator 210, the flag validator 220, the checkpoint manager 230, and the fault recovery manager 240, and/or, more generally, the example fault tolerance manager 240 of FIG. 2 may be implemented by hardware and/or any combination of hardware and executable instructions (e.g., software and/or firmware). Thus, for example, any of the version indicator 210, the flag validator 220, the checkpoint manager 230, and the fault recovery manager 240, and/or, more generally, the example fault tolerance manager 146 could be implemented by at least one of an analog or digital circuit, a logic circuit, a programmable processor, an application specific integrated circuit (ASIC), a programmable logic device (PLD) and/or a field programmable logic device (FPLD). When reading any of the apparatus or system claims of this patent to cover a purely software and/or firmware implementation, at least one of the version indicator 210, the flag validator 220, the checkpoint manager 230, and the fault recovery manager 240, and/or, more generally, the example fault tolerance manager 146 is/are hereby expressly defined to include a tangible machine readable storage device or storage disk such as a memory, a digital versatile disk (DVD), a compact disk (CD), a Blu-ray disk, etc. storing the executable instructions. Further still, the example fault tolerance manager 146 of FIG. 2 may include at least one element, process, and/or device in addition to, or instead of, those illustrated in FIG. 2, and/or may include more than one of any or all of the illustrated elements, processes and devices.

Figure 3:
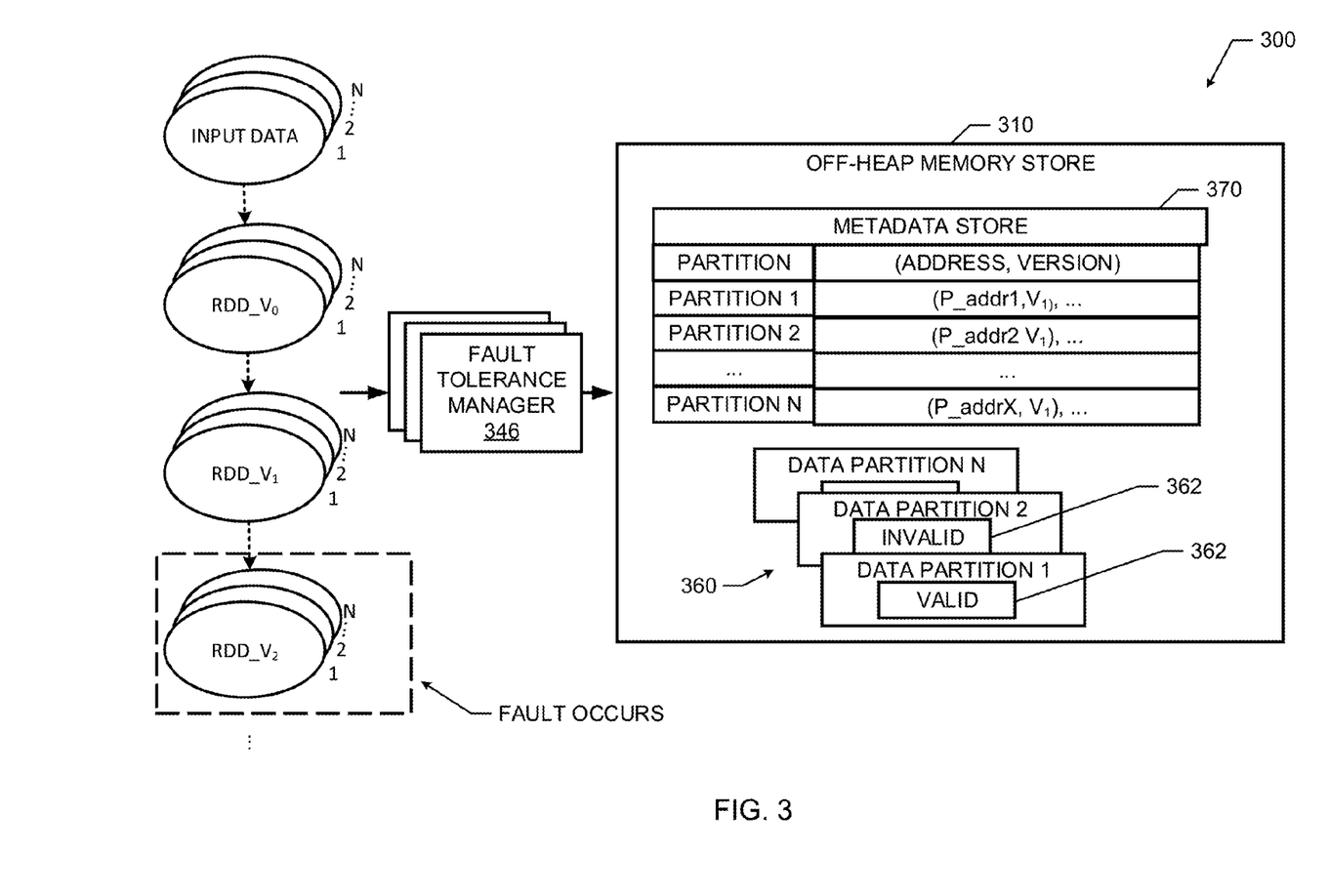
FIG. 3 is a schematic diagram of an example off-heap memory fault tolerance system that may be implemented by the data processing system of FIG. 1.

FIG. 3 is a schematic diagram of an example off-heap memory fault tolerance system 300 that may be implemented in the data processing system 100 to recover from a fault in accordance with an aspect of this disclosure. In the example of FIG. 3, iterations of partitions of RDD data are shown in a progression of versions from input data to $RDD\_V_0$, to $RDD\_V_1$, to $RDD\_V_2$. As shown, the fault tolerance managers 346 track the versions of the partitions 1-N and update the metadata store 370 of the off-heap memory store 310. In the example of FIG. 3, a fault occurs while executing version $RDD\_V_2$ of the RDD data.

Upon recovery from the fault while executing $RDD\_V_2$, the fault recovery manager 240 refers to the valid flags 362 of the partitions 360 and metadata store 370. In FIG. 3, data partition 1 is valid and data partition 2 is invalid. Accordingly, the fault tolerance manager 146 recognizes that the partition 1 of the RDD is updated, however the partition 2 of the RDD is not correct. Accordingly, the fault tolerance manager 146 may instruct a process iterator 144 for partition 2 to perform a lineage-based recomputation of the RDD data in partition 2, from the input data, to $RDD\_V_0$, to $RDD\_V_1$ (e.g., by instructing the process iterator to execute 2 iterations on the RDD data in partition 2). After the process iterator 144 recomputes partition 2 to version 1, partitions 1 and 2 are then restored to the point of the fault and the process iterators 144 (and/or processing coordinator 130) may resume execution/processing of the partitions 1 and 2 of the RDD from the point at which the fault occurred.

FIG. 4 is an example schematic diagram of an off-heap memory fault tolerance system 400 that may be implemented in the data processing system 100 to recover from a fault using a checkpoint persist. In the example of FIG. 4, iterations of partitions of RDD data are shown in a progression of versions from input data to $RDD\_V_0$, to $RDD\_V_1$, to $RDD\_V_2$. As shown, the fault tolerance managers 446 track the versions of the partitions and update the metadata store 470 of the off-heap memory store 410 to indicate an address of checkpoint versions of the partitions (e.g., $RDD\_V_0$ of Partition 1 is located at address 'P_addr1', $RDD\_V_1$ of Partition 1 is located at address 'P_addr2'). In the example of FIG. 4, a fault occurs while executing version $RDD\_V_2$ of the RDD data.

Upon recovery from the fault while executing $RDD\_V_2$, the fault recovery manager 240 refers to metadata store 470 to determine if a version of the data partition of the RDD at the time of the fault is persisted in the off-heap memory 410. For example, the fault recovery manager 240 may check the partitions 460 for the RDD. As shown in FIG. 4, the recovery manager 240 may determine that version $RDD\_V_1$ of partition 1 has been persisted via the checkpoint persist and find that $RDD\_V_1$ of partition 1 is located at address 'P_addr2'. Accordingly, the fault recovery manager 240 may restore partition 1, such that the process iterator 144 for partition 1 may resume execution of RDD_1. In FIG. 4, atomic operations (e.g., similar to indicating the version and using the valid flags) are used for each checkpoint persist.

Figure 5:
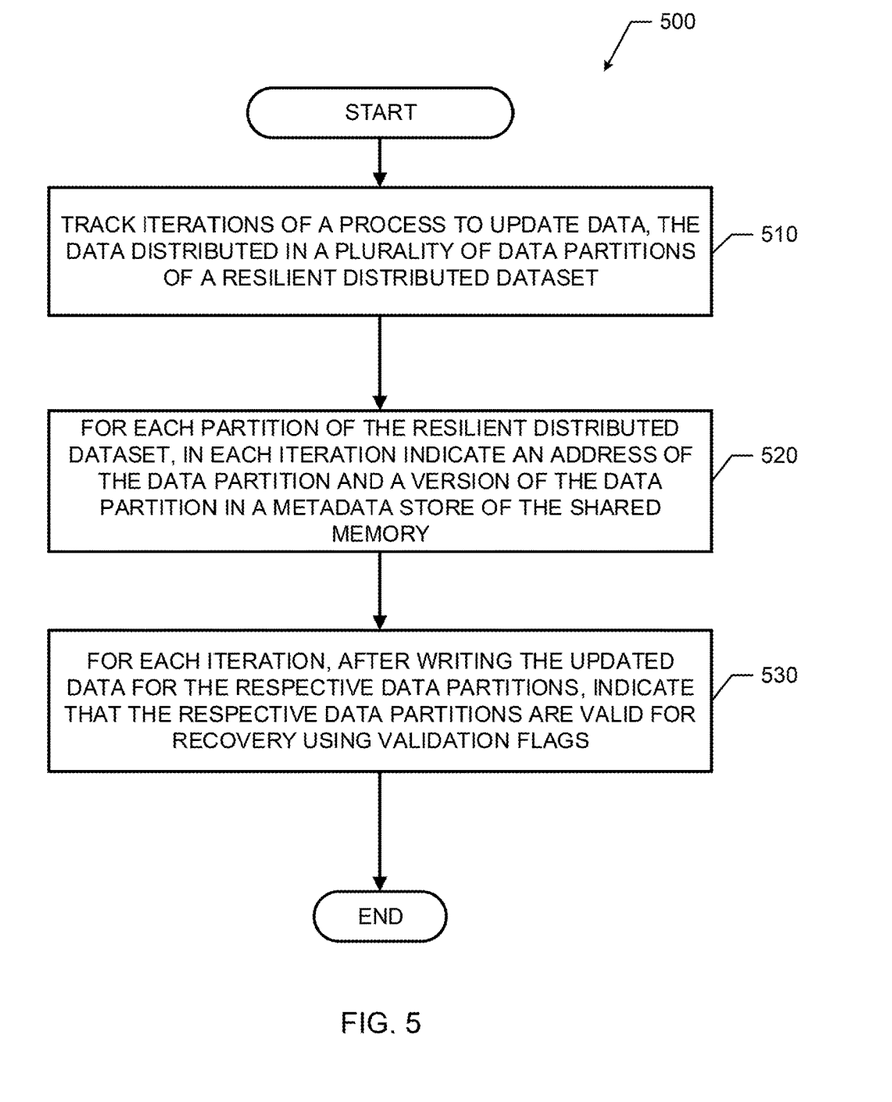
FIG. 5 is a flowchart representative of example machine readable instructions that may be executed to implement the fault tolerance manager of FIG. 2 to ensure fault tolerance for a resilient distributed dataset in a shared memory in accordance with examples herein.
Figure 6:
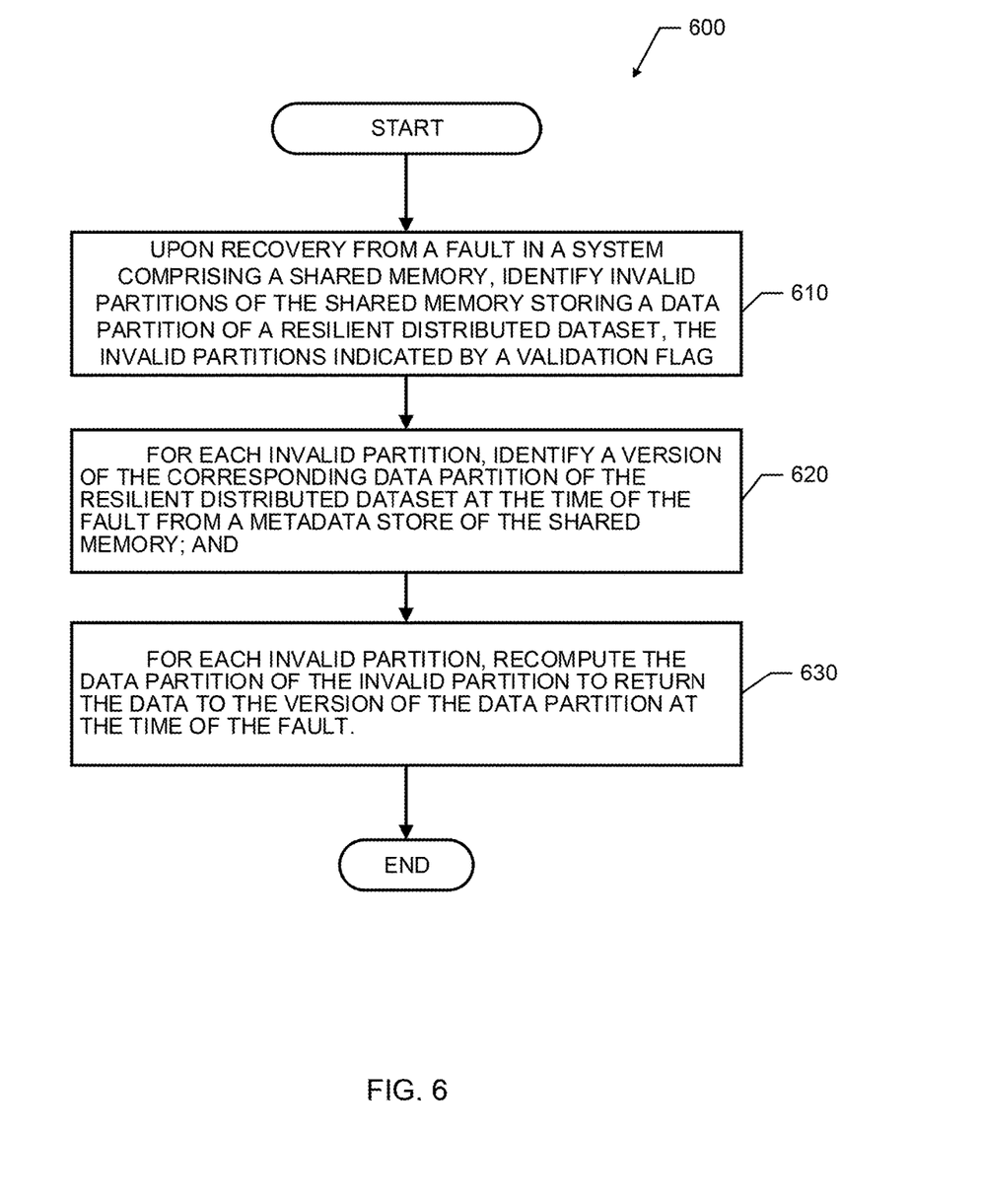
FIG. 6 is a flowchart representative of example machine readable instructions that may be executed to implement the fault tolerance manager of FIG. 2 to recover from a fault in accordance with examples herein.
Figure 7:
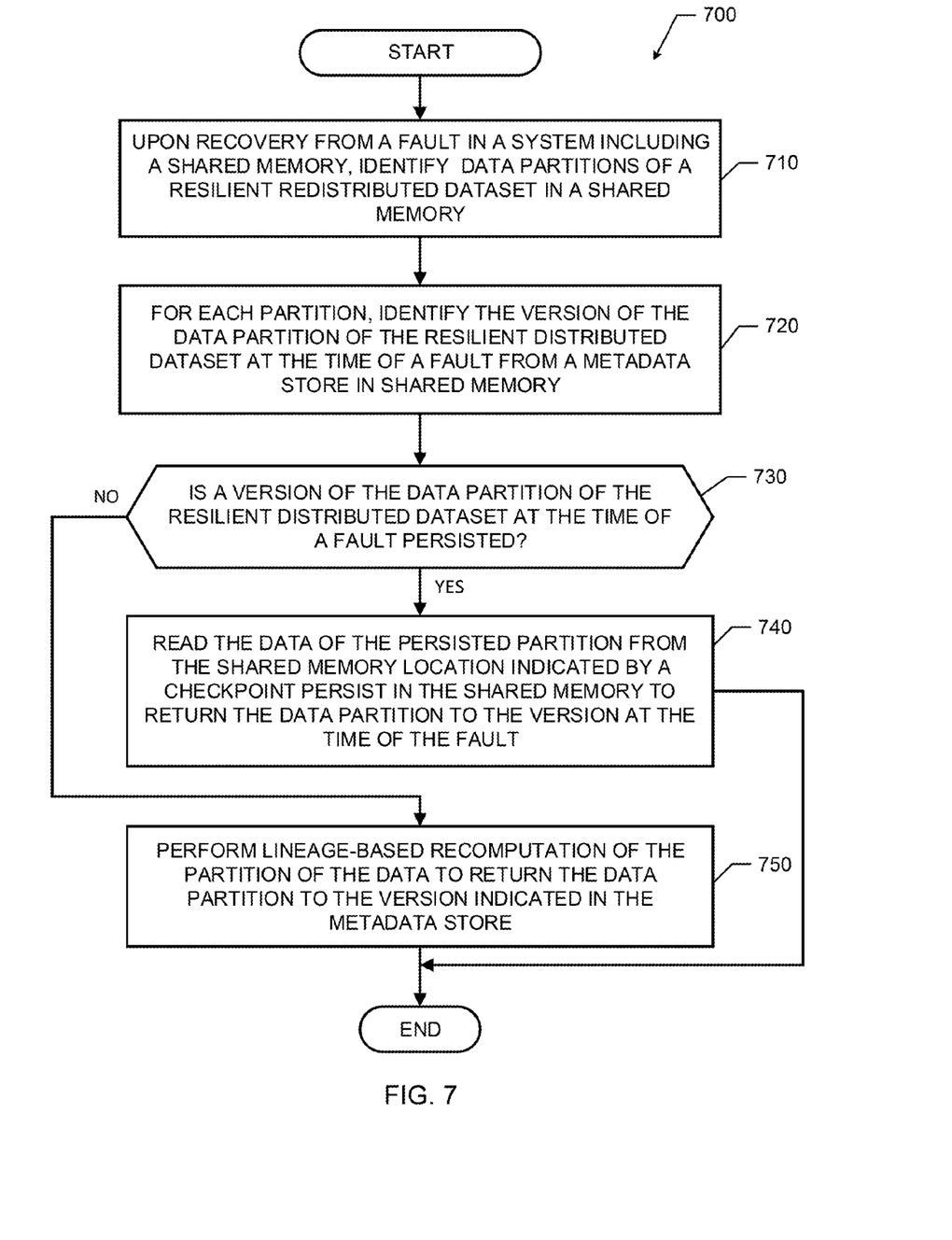
FIG. 7 is a flowchart representative of example machine readable instructions that may be executed to implement the fault tolerance manager of FIG. 2 to recover from a fault using a checkpoint persist in accordance with examples herein.

Flowcharts representative of example machine readable instructions for implementing the fault tolerance manager 146 of FIG. 2 are shown in FIGS. 5, 6, and 7. In this example, the machine readable instructions comprise a program/process for execution by a processor such as the processor 812 shown in the example processor platform 800 discussed below in connection with FIGS. 5, 6, and 7. The program/process may be embodied in executable instructions (e.g., software) stored on a tangible machine readable storage medium such as a CD-ROM, a floppy disk, a hard drive, a digital versatile disk (DVD), a Blu-ray disk, or a memory associated with the processor 812, but the entire program/process and/or parts thereof could alternatively be executed by a device other than the processor 812 and/or embodied in firmware or dedicated hardware. Further, although the example program is described with reference to the flowchart illustrated in FIGS. 5, 6, and 7, many other methods of implementing the example fault tolerance manager 146 may alternatively be used. For example, the order of execution of the blocks may be changed, and/or some of the blocks described may be changed, eliminated, or combined.

The example process 500 of FIG. 5 begins with an initiation of the fault tolerance manager 146 (e.g., upon startup, upon instructions from a user, upon startup of a device implementing the fault tolerance manager 146 (e.g., a processing partition 140), etc.). The example process 500 may be executed to provide fault tolerance in a shared memory. At block 510, the fault tolerance manager 146 tracks iterations of a process to update data distributed in a plurality of data partitions of a resilient distributed dataset. At block 520, for each partition of the resilient distributed dataset, in each iteration the version indicator 210 indicates an address of the data partition and a version of the data partition in a metadata store 170 of the shared memory 110. At block 530, for each iteration, after writing the updated data for the respective data partitions, the flag validator 220 indicates that the respective data partitions are valid for recovery using valid flags. After block 530, the example process ends. Following execution of the example process 500 of FIG. 5 (or several iterations of the example process 500 of FIG. 5), the fault recovery manager may recover the resilient distributed data in the shared memory 110 from a fault.

The example process 600 of FIG. 6 begins with an initiation of the fault recovery manager 240. The example process 600 may be executed to recover from a fault in a shared memory system in accordance with examples herein. At block 610, upon recovery from a fault in a system 100 including a shared memory 110, the fault recovery manager 240 identifies invalid partitions of the shared memory 110 storing a data partition of a resilient distributed dataset. At block 620, for each invalid partition, the fault recovery manager 240 identifies a version of the corresponding data partition of the resilient distributed dataset at the time of the fault from the metadata store 170 in the shared memory 110. At block 630, for each partition, the fault recovery manager 240 recomputes the data of the partition to return the data to the version at the time of the fault. After block 630, the example process 600 ends.

The example process 700 of FIG. 7 begins with an initiation of the fault recovery manager 240. The example process 700 may be executed to recover from a fault in a shared memory system using selective immutability and/or a checkpoint persist in accordance with examples herein. At block 710, upon recovery from a fault in a system 100 including a shared memory 110, the fault recovery manager 240 identifies data partitions of a RDD in the shared memory 110. At block 720, for each partition, the fault recovery manager 240 identifies the version of the data partition of the RDD at the time of the fault from the metadata store 170 in the shared memory 110.

At block 730, the fault recovery manager 240 determines whether a version of the data partition of the RDD at the time of the fault is persisted (e.g., whether a checkpoint version is persisted). If a version of the data partition of the RDD is not persisted, control advances to block 750. If a version of the data partition of the RDD is persisted (block 730), then at block 740, the fault recovery manager 240 reads the data of the persisted partition from the shared memory location indicated by a checkpoint persist in the shared memory 110 to return the data partition to the version at the time of the fault. After block 740, the example process 700 ends. At block 750, the fault recover manager 240 performs a lineage-based recomputation of the partition of the data to return the partition of the RDD to the version indicated in the metadata store.

As mentioned above, the example processes of FIGS. 5, 6, and/or 7 may be implemented using coded instructions (e.g., computer and/or machine readable instructions) stored on a tangible machine readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible machine readable storage medium is expressly defined to include any type of machine readable storage device and/or storage disk and to exclude propagating signals and to exclude transmission media. As used herein, "computer readable storage medium" and "machine readable storage medium" are used interchangeably. Additionally or alternatively, the example processes of FIGS. 5, 6, and/or 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory machine readable medium is expressly defined to include any type of machine readable storage device and/or storage disk and to exclude propagating signals and to exclude transmission media.

As used herein, when the phrase "at least" is used as the transition term in a preamble of a claim, it is open-ended in the same manner as the term "comprising" is open ended. As used herein the term "a" or "an" may mean "at least one," and therefore, "a" or "an" do not necessarily limit a particular element to a single element when used to describe the element. As used herein, when the term "or" is used in a series, it is not, unless otherwise indicated, considered an "exclusive or."

Figure 8:
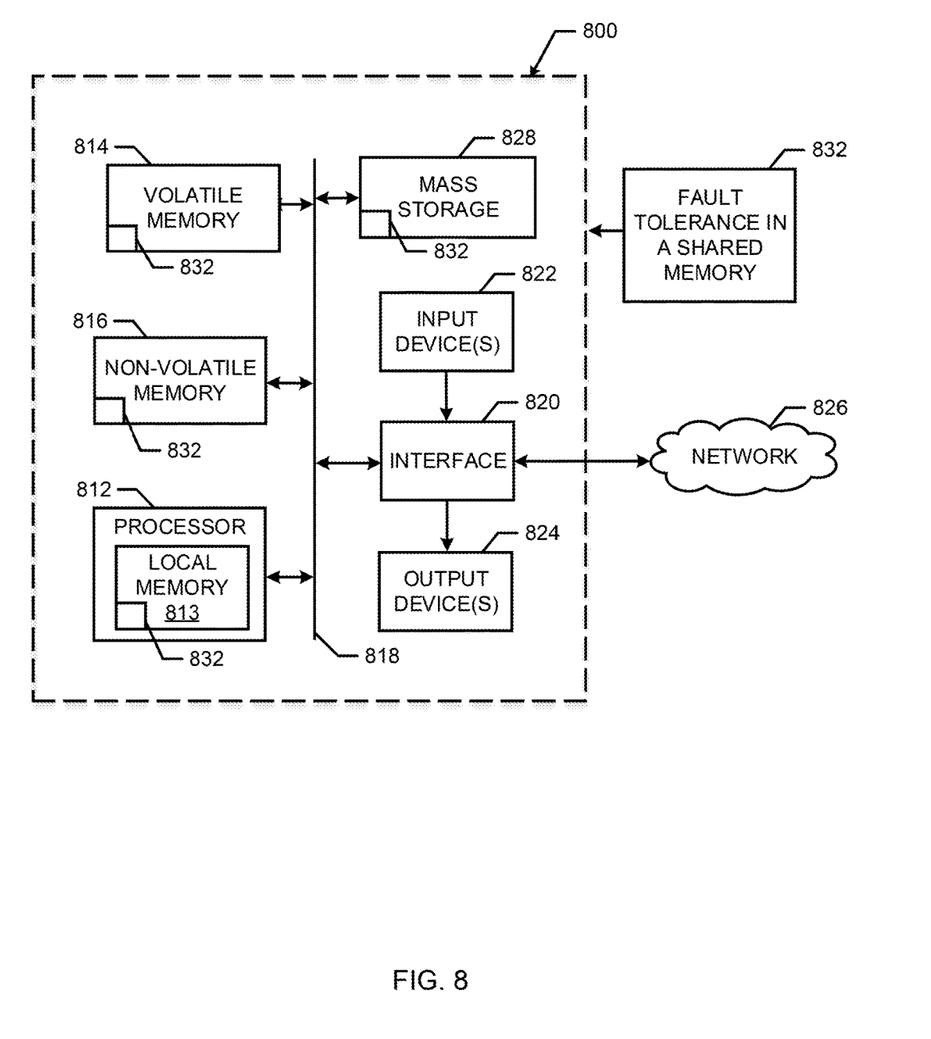
FIG. 8 is a block diagram of an example processor platform capable of executing the instructions of FIGS. 5, 6, and/or 7 to implement the fault tolerance manager of FIG. 2.

FIG. 8 is a block diagram of an example processor platform 800 capable of executing the instructions of FIGS. 5, 6, and/or 7 to implement the fault tolerance manager 146 of FIG. 2. The example processor platform 800 may be or may be included in any type of apparatus, such as a server, a personal computer, or any other type of computing device.

The processor platform 800 of the illustrated example of FIG. 8 includes a processor 812. The processor 812 of the illustrated example is hardware. For example, the processor 812 can be implemented by at least one integrated circuit, logic circuit, microprocessor or controller from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory, a persistent, byte-addressable memory accessible via a memory fabric and/or any other desired type of non-volatile memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a peripheral component interconnect (PCI) express interface.

In the illustrated example, at least one input device 822 is connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, and/or a voice recognition system.

At least one output device 824 is also connected to the interface circuit 820 of the illustrated example. The output device(s) 824 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 820 of the illustrated example, thus, may include a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826

(e.g., an Ethernet connection, a digital subscriber line (DSL), a telephone line, coaxial cable, a cellular telephone system, etc.).

The processor platform 800 of the illustrated example also includes at least one mass storage device 828 for storing executable instructions (e.g., software) and/or data. Examples of such mass storage device(s) 828 include floppy disk drives, hard drive disks, compact disk drives, Blu-ray disk drives, RAID systems, and digital versatile disk (DVD) drives.

The coded instructions 832 of FIGS. 5, 6, and/or 7 may be stored in the mass storage device 828, in the local memory 813 in the volatile memory 814, in the non-volatile memory 816, and/or on a removable tangible machine readable storage medium such as a CD or DVD.

From the foregoing, it will be appreciated that the above disclosed methods, apparatus and articles of manufacture provide fault tolerance in a shared memory. In examples herein, a valid flag and metadata store that stores an address for data partitions of a RDD and versions of the data partitions of the RDD at that address may be used to recover from a fault and return the distributed data to a state at or near the time of the fault. In some examples, a checkpoint persist may be used that persists versions of the partitions of the RDD in the shared memory. The checkpoint persist may indicate addresses in which versions of the partitions of the RDD may be located. Accordingly, these mechanisms may be used to achieve fault tolerance in a shared memory system.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method performed by a system comprising a hardware processor, comprising:
    tracking iterations of a process to update data in a shared memory, the data distributed in a plurality of data partitions of a resilient distributed dataset;
    in a respective iteration of the iterations:
        for each respective data partition of the plurality of data partitions, indicating in a metadata store an address of the respective data partition, and including in the metadata store a version identifier of the respective data partition; and
        after writing updated data for corresponding data partitions of the plurality of data partitions, indicating that the corresponding data partitions are valid for recovery using valid flags;
    after a fault occurs, referring to the valid flags of the plurality of data partitions to identify a first data partition that is invalid;
    accessing the metadata store to determine a version of the first data partition at a time of the fault; and
    performing a lineage based recomputation of the first data partition to recover from the fault, the lineage based recomputation using a plurality of versions of the first data partition to recover to the version indicated in the metadata store at the time of the fault.

2. The method of claim 1, wherein subsequent versions of a given data partition of the plurality of data partitions are to be written at an address of the given data partition indicated in the metadata store to perform an in-place update.

3. The method of claim 1, wherein subsequent versions of a given data partition of the plurality of data partitions are to be stored at checkpoint addresses different from an address of the given data partition indicated in the metadata store.

4. The method of claim 1, further comprising updating the version identifier of the respective data partition in the metadata store in response to a subsequent iteration of processing of the respective data partition.

5. The method of claim 1, further comprising:
    setting the valid flag for the respective data partition to invalid during an update that updates data of the respective data partition; and
    setting the valid flag for the respective data partition to valid in response to completion of the update of the respective data partition.

6. The method of claim 1, further comprising persisting a checkpoint of the respective data partition at a different address from the address of the respective data partition indicated in the metadata store, the checkpoint to be used to recover the respective data partition in response to a fault.

7. The method of claim 1, wherein the version identifier of the respective data partition represents a version of the respective data partition, and the version identifier comprises a counter that advances in value in response to an update of the respective data partition.

8. The method of claim 1, wherein performing the lineage based recomputation of the first data partition to recover from the fault is in response to determining that the resilient distributed dataset is not tagged to use a checkpoint.

9. The method of claim 6, wherein persisting the checkpoint is in response to determining that the resilient distributed dataset is tagged to use a checkpoint.

10. A non-transitory machine readable medium comprising instructions that, when executed, cause a machine to:
    to recover from a fault in a system comprising a shared memory storing a plurality of data partitions of a resilient distributed dataset, identify a first data partition that is invalid, as indicated by a valid flag;
    for the first data partition that is identified as invalid, identify a version of the first data partition at a time of the fault from a metadata store of the shared memory; and
    recompute the first data partition using a lineage based recomputation that uses a plurality of versions of the first data partition to return data of the first data partition to the version of the first data partition at the time of the fault, the lineage based recomputation recomputing the first data partition from input data, a first version of the plurality of versions, and a second version of the plurality of version.

11. The non-transitory machine readable medium of claim 10, wherein the instructions, when executed, further cause the machine to:
    to recover from the fault, identify valid data partitions of the shared memory indicated by respective valid flags; and
    retrieve the valid data partitions for subsequent processing.

12. The non-transitory machine readable medium of claim 10, wherein the lineage based recomputation comprises:
    recomputing the first data partition to return the data to the version at the time of the fault by performing a same number of iterations as indicated by the version.

13. The non-transitory machine readable medium of claim 10, wherein the instructions, when executed, further cause the machine to:
    for a given data partition of the plurality of data partitions, determine whether a version of the given data partition is persisted; and retrieve the persisted version of the given data partition using a checkpoint persist.

14. The non-transitory machine readable medium of claim 13, wherein the persisted version is located at a different address from an original version of the given data partition.

15. The non-transitory machine readable medium of claim 10, wherein the recomputing of the first data partition using the lineage based precomputation is in response to determining that the resilient distributed dataset is not tagged to use a checkpoint.

16. An apparatus comprising:
a processor; and
a non-transitory storage medium storing instructions executable on the processor to:
  indicate a version of a first partition of a first resilient distributed dataset in a first metadata store, the first resilient distributed dataset tagged to use a checkpoint;
  set a first valid flag to indicate whether the first partition is valid or invalid based on a write operation being performed on the first partition;
  persist a checkpoint version of the first partition of the first resilient distributed dataset responsive to the first resilient distributed dataset being tagged to use a checkpoint; and
  use the version of the first partition, the first valid flag, and the checkpoint version to recover the first resilient distributed dataset from a fault;
  indicate a version of a second partition of a second resilient distributed dataset in a second metadata store, the second resilient distributed dataset not tagged to use a checkpoint;
  set a second valid flag to indicate whether the second partition is valid or invalid; and
  use the second valid flag, the version of the second partition, and a lineage based recomputation to recover the second partition from a fault of the second resilient distributed dataset, the lineage based recomputation used to recover the second partition responsive to the second resilient distributed dataset not tagged to use a checkpoint.

17. The apparatus of claim 16, wherein the instructions are executable on the processor to update the version for the first partition after each iteration of processing the first partition.

18. The apparatus of claim 16, wherein the instructions are executable on the processor to set the first valid flag for the first partition to invalid during an update of the first partition, and set the first valid flag to valid after completion of the update.

19. The apparatus of claim 16, wherein the instructions are executable on the processor to update a checkpoint persist to indicate locations of versions of the first partition in a shared memory.

20. The apparatus of claim 16, wherein the lineage based recomputation uses a plurality of versions of the second partition to recover from the fault of the second resilient distributed dataset, the lineage based recomputation recomputing the second partition from input data, a first version of the plurality of versions, and a second version of the plurality of version.

* * * * *